United States Patent [19]

Mankin et al.

[11] 3,757,581
[45] Sept. 11, 1973

[54] DISPLACEMENT METER FOR MEASURING FLUIDS

[75] Inventors: Paul A. Mankin; Thomas O. Mitchell; Paul Zanoni, all of Muskegon, Mich.

[73] Assignee: Bennett Pump Incorporated, Muskegon, Mich.

[22] Filed: Oct. 28, 1971

[21] Appl. No.: 193,303

[52] U.S. Cl. ........................... 73/247, 92/72, 92/249
[51] Int. Cl. .............................................. G01f 3/04
[58] Field of Search ................. 73/239, 247, 272 R; 91/477; 92/72, 248, 249

[56] References Cited
UNITED STATES PATENTS
1,912,687  6/1933  Brouse .................................. 73/247
2,630,101  3/1953  Batchelder ....................... 73/247 X FOREIGN PATENTS OR APPLICATIONS
24,374/35  9/1935  Australia ............................. 73/247
231,089    5/1944  Switzerland ..................... 73/272 R Primary Examiner—Richard C. Queisser
Assistant Examiner—John P. Beauchamp
Attorney—Thomas M. Marshall

[57] ABSTRACT

The disclosure relates to an improved meter for measuring fluids such as gasoline including a plurality of pistons connected to a crankshaft by means of flexible rods, with the common crankshaft being journalled in axial relation to a series of cylinders. An adjustable eccentric mechanism is arranged on the crankshaft to enable an accurate adjustment of the stroke of the pistons, and a consequent adjustment of the displacement of the pistons to achieve a meter of high precision.

10 Claims, 9 Drawing Figures

Patented Sept. 11, 1973

INVENTORS
PAUL A. MANKIN
PAUL ZANONI
BY THOMAS O. MITCHELL

Thomas M. Marshall
ATTORNEY

INVENTORS
PAUL A. MANKIN
PAUL ZANONI
BY THOMAS O. MITCHELL

*Thomas M. Marshall*
ATTORNEY $r = d + e$ $r = d - e$

INVENTORS
PAUL A. MANKIN
PAUL ZANONI
BY THOMAS O. MITCHELL

Thomas M Marshall
ATTORNEY

DISPLACEMENT METER FOR MEASURING FLUIDS

The present invention relates to fluid meters of the type in which the measurement of the fluid is determined by the displacement of pistons within chambers through which the fluid is caused to flow, and the principal feature of the invention consists in the novel construction and arrangement of operating connections with the pistons whereby, regardless of inaccuracies of workmanship or construction, the meter may be very accurately calibrated.

Displacement meters for measuring fluids of the general type of the subject invention have been disclosed in U.S. letters Pat. No. 1,912,687, which issued to William H. D. Brouse on June 6, 1933. The displacement meter disclosed by Brouse is of the piston type which may be very closely adjusted and which will measure the fluid accurately as it passes therethrough at varying speeds of discharge. The meter casing is formed with two diametrically opposed pairs of cylinders, opening to a central chamber. Each cylinder has formed on one side thereof a duct communicating with a port at the outer end thereof and leading to an outlet port adjacent the inner end of the adjacent cylinder. The meter is adapted to operate with the cylinders in a horizontal plane, and the central chamber is formed on the top side of the casing and is divided into a plurality of ducts, one for each cylinder and each leading to a port arranged intermediate of the length of the wall of the respective cylinder and opening therethrough. A second duct arranged in the top wall of the casing between two adjacent cylinders leads through a boss to which is connected the meter's discharge pipe. In operation, each cylinder is in succession first opened to the inlet pressure, then closed to the inlet and immediately thereafter opened to the discharge, then closed to discharge and immediately thereafter opened to inlet; that is to say, the opening of a port to inlet is instantaneous upon being closed to discharge, and vice versa, with the result that the feed pressure operates the pistons in the cylinders successively and the discharge is accurately measured by each reciprocation of the pistons. As an example, two complete cycles of the displacement meter is equal to one fluid gallon of, for example, gasoline. The movement of the central crankshaft to which the pistons are attached is smooth and uniform and the rotative movement is used to operate an indicating device.

One of the primary problems with meters of this type is that the connection between each piston and the central crankshaft generally comprises a rigid rod which is journalled at its opposite ends respectively to the piston and to the common crankshaft. Because of mechanical and frictional problems associated with the connection of rigid rods to high cycling pistons, the components of the displacement meter had to be accurately machined so as to minimize the development of undue stresses and bending loads which result in wear along selected surfaces of cylinder walls. The consequence of such wear surfaces is leakage passed the pistons thereby affecting the precision of the metered flow. This is extremely disadvantageous in applications such as the retail dispensing of gasoline where high accuracy of the volumetric flow is required according to state laws.

Because of the problems mentioned above, displacement meters of the prior art devices were often extremely expensive to manufacture, and required constant attention and quantitative inspection in order to insure the proper operation of the displacement meter. Furthermore, it was common to design the prior art meters in an undesirable manner to provide "play" or additional clearance in the bearings interconnecting the rigid rods to the pistons in order to prevent the introduction of unbalancing forces between the fairly massive piston and cylinder members which are required to be very closely fitted together; e.g., on the order of one-half a thousandths of an inch.

Accordingly, it is an object of the present invention to overcome the disadvantages of the prior devices, and to provide a mechanical means for accurately measuring fluids while being dispensed, and as one feature, to provide a displacement meter which employs flexible connecting rods between the pistons and the central crankshaft. Other features of the meter of the subject invention will be discussed below.

It is a further object of the invention to provide meters of the type in which the measurement of the fluid is determined by the displacement of the pistons within chambers through which the fluid is directed, and it is an important feature that a substantially uniform pressure is maintained on both sides of the pistons while the fluid displacement is being effected to minimize the tendency of leakage past the pistons.

It is another feature of this invention to provide a novel construction and arrangement of parts of a fluid meter whereby fluid is directed consecutively into a plurality of measuring cylinders, the volume being positively controlled by valving provided in adjacent cylinders and pistons operating in the cylinders, and connected to a central crank through flexible piston rods.

It is still a further object of the invention to provide a fluid meter of the piston type wherein the fluid transfer and discharge ports of each piston are located at right angles, with the net result of this arrangement being an overall decrease in the forces being exerted on the cylinder walls during operation of the meter. Accordingly, the amount of frictional wear of the cylinders and pistons is decreased.

It is another object of the invention to provide a unique arrangement of elements of a fluid meter of the piston type wherein each piston includes a fluid transfer groove extending about the entire periphery thereof, as contrasted to prior art systems wherein a partial groove was provided in the piston wall surface. The construction of the subject pistons reduces manufacturing costs, and is effective to reduce the unbalanced pressure loads on the pistons.

Another object of the invention is to provide a fluid meter of the piston type with an eccentric mechanism including an eccentric mounted in a pre-loaded bearing assembly and adapted for mounting therein a crankshaft to which the pistons are connected, the pre-loaded bearing assembly functioning to maintain the eccentric and crankshaft in a substantially rigid position in order to maintain the accuracy of operation of the meter.

The preferable manner of utilizing this invention is to effect the displacement of the pistons by the pressure of the fluid being measured, but it must be understood that the same structure may be utilized in both pumping and measuring fluid, it being merely necessary to apply the driving force to the gear mechanism connected with the central crankshaft.

The form of the invention chosen for illustration is embodied in a fluid displacement meter, wherein the crankshaft is rotatively mounted within a bore in an eccentric that, in turn, is mounted in the meter casing by a pair of stationary bearings. The two outer ball races of said stationary bearings are placed near the ends of the eccentric with the races facing each other. An elastic member such as a rubber O-ring or spring washer places an axial force on the top outer race which, in turn, presses downward on the balls and the inner race which is integrally ground into the eccentric. The eccentric, in turn, presses downward on the bottom set of balls and the bottom race. Thus, the eccentric is held in place by the two sets of balls and subject to an axial force. As is readily apparent, the ball bearings which are pre-loaded in the axial direction become much stiffer radially. As a result, the ball bearings provide a greater restraining force against the radial forces imposed on the eccentric bearings as the meter rotates due to the high pressure under the pistons. These radial forces would normally tend to displace the eccentric in the bearings. Since the pressure drop across the meter is greater at high flows, the eccentric is displaced a greater amount which increases the stroke of the piston. Hence, when the meter is calibrated at one flow rate, then operated at a higher flow, the meter will pass more fluid, due to its increased displacement, than is recorded. These inaccuracies are obviated by the instant arrangement wherein the preloaded bearings provide a greater restraining force against such radial forces.

Each piston is connected to the crankshaft by means of a flexible rod, preferably made of a plastic material such as Celcon which is not adversely affected by volatile fuels such as gasoline. The flexible connecting rods do not require close alignment or large bearing clearances to provide free operation of the pistons, and therefore the flexible connecting rods are capable of transmitting some of the structural force moments to the connecting rod bearing. Wear at this point does not affect the calibration curve. This is primarily due to the fact that since the piston rods are flexible, the rods will allow the piston to align itself. Since the pressure on the underside of the piston is always higher than on the opposite side, the flexible connecting rods are always in tension and there is no tendency for them to buckle.

The novel features which are considered as characteristics for the invention are set forth in particular in the appended claims. The invention itself, however, both as to its construction and its method of operation, together with additional objects and advantages, will be best understood from the following description of specific embodiments when read in conjunction with the accompanied drawings, in which;

Figure 1:
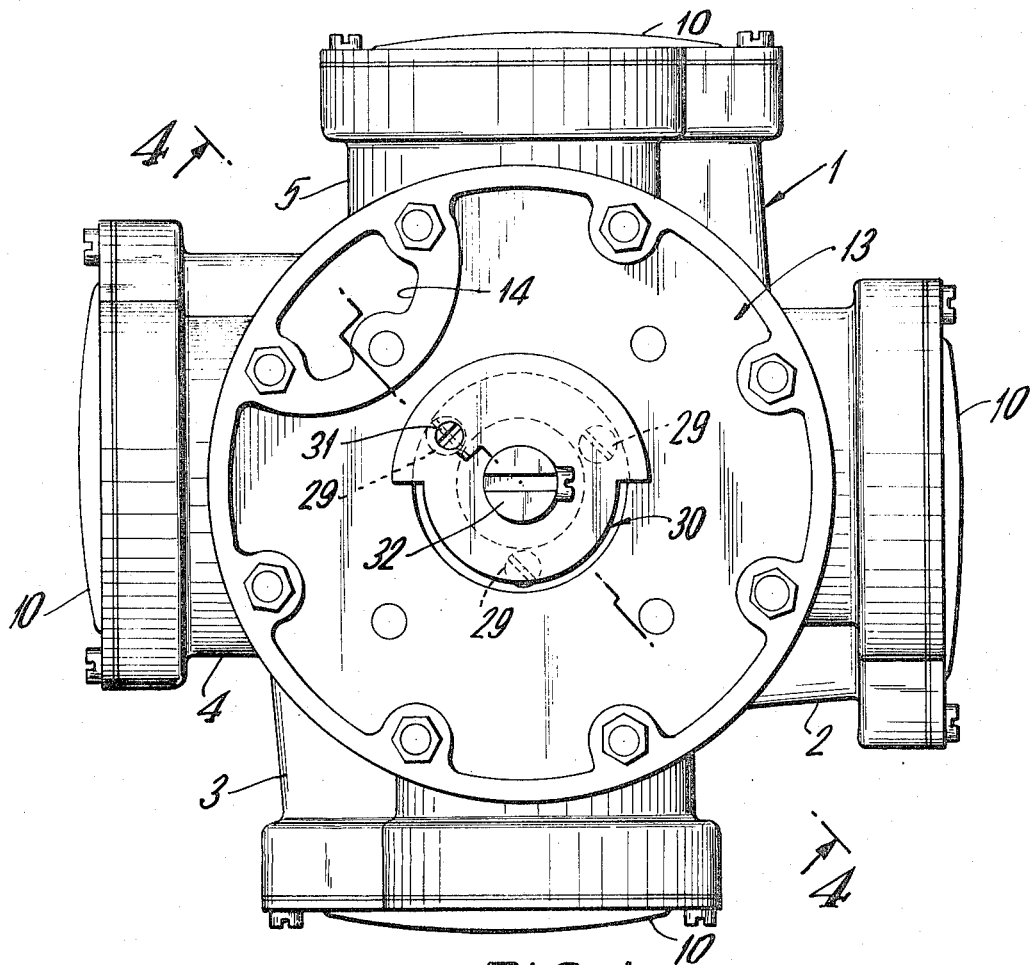
FIG. 1 is a plan view of the fluid displacement meter of the subject invention.

Referring to FIGS. 1 through 4, the fluid displacement meter of the subject invention includes a meter casing 1 formed with cylinders 2, 3, 4, 5 arranged in diametrically opposite pairs opening to a central chamber 6. The meter casing may be made of cast iron, with each cylinder having formed on one side thereof a duct 7 (see FIG. 2) communicating at one end with a port 8 disposed at the outer end of the cylinder, with the opposite end of said duct 7 leading to a port 9 adjacent the inner end of the adjacent cylinder. The outer end of each cylinder is closed by a cap 10 which also closes the outer end of the duct 7. Formed in the upper surface of each cylinder is a discharge port 11 leading to an annular manifold or discharge chamber 12 defined by a recess in the upper portion of the meter casing 1 and the meter cover 13. A discharge opening 14 is provided in the cover 13 for connection to a suitable hose extending to the dispensing portion of the system in which the subject fluid meter is embodied. The lower portion of the meter casing 1 is closed by a plate 15 including a aperture 16 which leads to the central chamber 6 and is connected by a pipe (not shown) extending from a feed pump which directs a constant flow of pressurized fluid to be measured into the central chamber.

The arrangement of the discharge manifold 12 in the upper portion of the meter is particularly advantageous. This arrangement enables the meter casing to be easily cast, while also enabling rapid inspection of the discharge manifold by merely removing the cover 13 from the casing body. In the prior art fluid displacement meters, the casing was cast such that the manifold was partially hidden, which resulted in a complicated and costly casting. Furthermore, this prior art arrangement also resulted in a manifold which readily accumulated hidden dirt, flash or other foreign material, which was not easily detected by visible inspection.

Formed integral with and depending from the top cover 13 is a boss 17 in which a crankshaft 20 is journalled, said crankshaft being tapered as at 20' and having a crank disc 21 at its tapered end within the central chamber 6. A crank pin 22 is mounted on the crank disc 21 and extends across the chamber 6 and is threaded at its outer end. An eccentric 23 is rotatively mounted on a crankshaft 20, said eccentric comprises a generally elongated rod having a longitudinally extending bore extending therethrough offset with respect to the centerline of the rod. Furthermore, the outer surface of said eccentric forms the inner bearing races for upper bearing 25 and lower bearing 26, the outer races of said bearings being mounted on the boss 17. As illustrated, ball bearings 25, 26 are placed near the opposite ends of the eccentric 23, with the two outer ball races being placed with the races facing each other. An arrangement of an O-ring seal and retaining member 24 is placed above the upper bearing 25, and a seal 27, such as a rubber O-ring or spring washer, is disposed between the upper end of the eccentric sleeve assembly and the upper portion of the cover 13. Seal 27 is an elastic member which functions to provide a constant axial pressure downward on the eccentric and ball bearing arrangement, as more fully described hereinafter.

The crankshaft assembly is held in place by a cover 28 which is mounted in the meter cover 13 by an arrangement of screws 29. It is noted that the construction of the crankshaft bearing assembly and more particularly the seal 27 is operative to place an axial force on the top outer race of the bearing 25 which, in turn, presses downward on the balls of bearing 25 and the inner race thereof which is integrally ground into the eccentric 23. In turn, the eccentric 23 presses downward on the bottom ball bearing 26, and thus the eccentric is held in place by the two sets of ball bearings 25, 26, and is subjected to an axial force. As is well known, a ball bearing which is pre-loaded in the axial direction becomes much stiffer radially. It is this principle which the subject crankshaft bearing assembly relies on in order to provide greater rigidity of the crankshaft assembly so as to effectively define a pre-loaded bearing assembly to which the pistons are connected, as more fully described hereinafter. The pre-loaded bearing assembly functions to maintain the eccentric 23 in a substantially rigid position relative to the crankshaft 20 in order to maintain the accuracy of operation of the meter.

Adjustment of the stroke of the pistons of the meter is achieved by rotation of the eccentric 23 relative to the crankshaft 20, and this is effected by an adjustment assembly, designated by the numeral 30, disposed externally of the meter casing. The adjustment assembly 30 (see FIG. 4) includes an upper disc member 30a which is suitably connected to the crankshaft 20, and a lower disc member 30b which is suitably connected to the eccentric 23. Each disc member 30a and 30b includes an array of holes, as shown by the dotted lines. The upper and lower array of holes are arranged in an eccentric pattern such that at any adjusted position of the disc members 30a and 30b, at least one set of aligned holes is provided for receiving a locking screw 31. The latter is provided for maintaining the position of the adjustment assembly after the meter has been calibrated. In order to adjust the eccentric 23 relative to the crankshaft for adjusting the stroke of the pistons, as more fully described hereinafter with reference to FIGS. 6A–6D, the locking screw 31 is removed, and the discs 30a and 30b are rotated relative to one another to the desired adjustment position, and a hole in the upper disc is aligned with a hole in the lower disc, after which the locking screw 31 is passed through the aligned holes in order to lock the eccentric and crankshaft together. Also extending externally of the meter casing and connected to the shaft 20 is a coupling 32. The coupling is adapted to be connected to a suitable gear train extending to a totalizing device or the like for totalizing the number of revolutions of the meter in order to provide an indication of the amount of fluid being metered through the displacement meter of the subject invention.

With reference to the adjustment of the meter, reference is now made to FIGS. 6A – 6D where the relationship between the eccentric and the crankshaft is schematically illustrated for the two extreme adjustable positions. As illustrated, the centerline of the bore in eccentric 23 is offset with respect to the center line of the eccentric by an amount indicated by the letter "e." The space in between the centerline of the bore of the eccentric 23 and the centerline of the crankshaft pin 22 is designated by the letter "d." As is readily apparent, the total stroke of each piston (after the angular relationship between the eccentric and the crankshaft has been fixed) is equal to two times the distance between the centerline of the eccentric 23 and the centerline of the pin 22, this distance being indicated by the reference letter "r." In the position of the elements illustrated in FIGS. 6A and 6B, the total stroke is 2r which corresponds to twice the sum of "d" plus "e," whereas in the position illustrated in FIGS. 6C and 6D the total stroke (2r) is equal to twice the value of "d" minus "e." Based on the above, it is readily apparent that the center of rotation of the crankshaft assembly is effectively defined by the eccentric and bearing arrangement, and is not defined by the centerline of the crankshaft 20. It is through this arrangement that adjustment of the stroke of the pistons of the meter may be readily achieved with the precision required for gasoline dispensing apparatus.

Valving pistons 35 are mounted one in each of the cylinders 2, 3, 4 and 5, and are connected by flexible connecting rods 36 to the eccentric crank pin 22. A bushing 33, preferably made of carbon is provided about the eccentric pin 22, and the ends of the assembly of the connecting rods 36 and the bushing 33 is held on the pin 22 by a washer 34' and a threaded lock nut 34. (See FIG. 4). The arrangement of the connecting rods 36, along with the eccentric and crankshaft assembly enables a very accurate adjustment of the piston to be made within the cylinders to regulate the stroke and displacement of the pistons, and consequently the volume of discharge from the cylinders.

Figure 5:
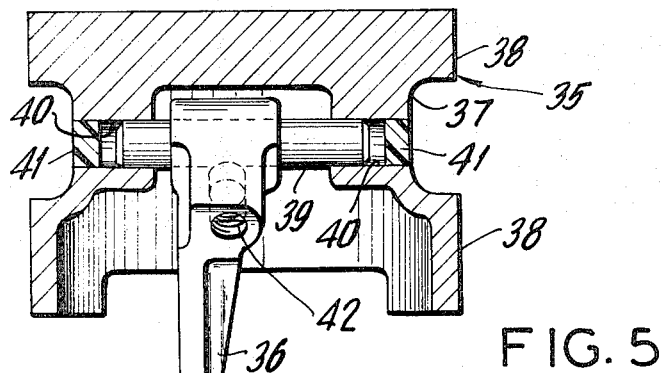
FIG. 5 is a partial sectional view of a piston and flexible connecting rod assembly to be embodied in the displacement meter of the subject invention.
Figure 3:
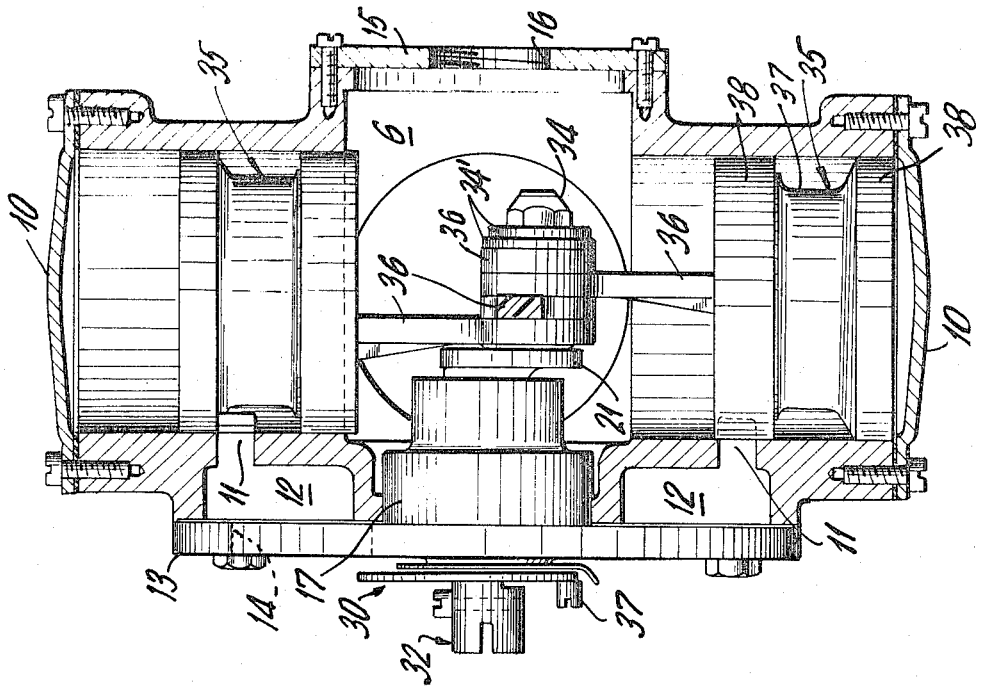
FIG. 3 is a view taken along line 3—3 in FIG. 2.

Turning to FIG. 5, each of the pistons 35 is of the spool-type employing a circumferential groove 37 defined between lands 38, 38. The groove 37 extends completely about the body of the piston to define a valving means to allow the passage of fluid from the transfer port 9 to the discharge port 11, as more fully described hereinafter. The flexible connecting rod assembly 36 is secured to the piston 35 by means of a wrist pin 39 mounted in an aperture 40 extending through the piston 35 in the vicinity of the circumferential groove 37. Plugs 41 are provided at each end of the aperture 40 for sealing the annular groove 37 and thereby preventing fluid communication between the central chamber 6 and the annular groove 37. The wrist pin 39 passes through and is secured to the end of the connecting rod 36, with a set screw arrangement 42 being provided for holding the wrist pin and rod together.

Figure 4:
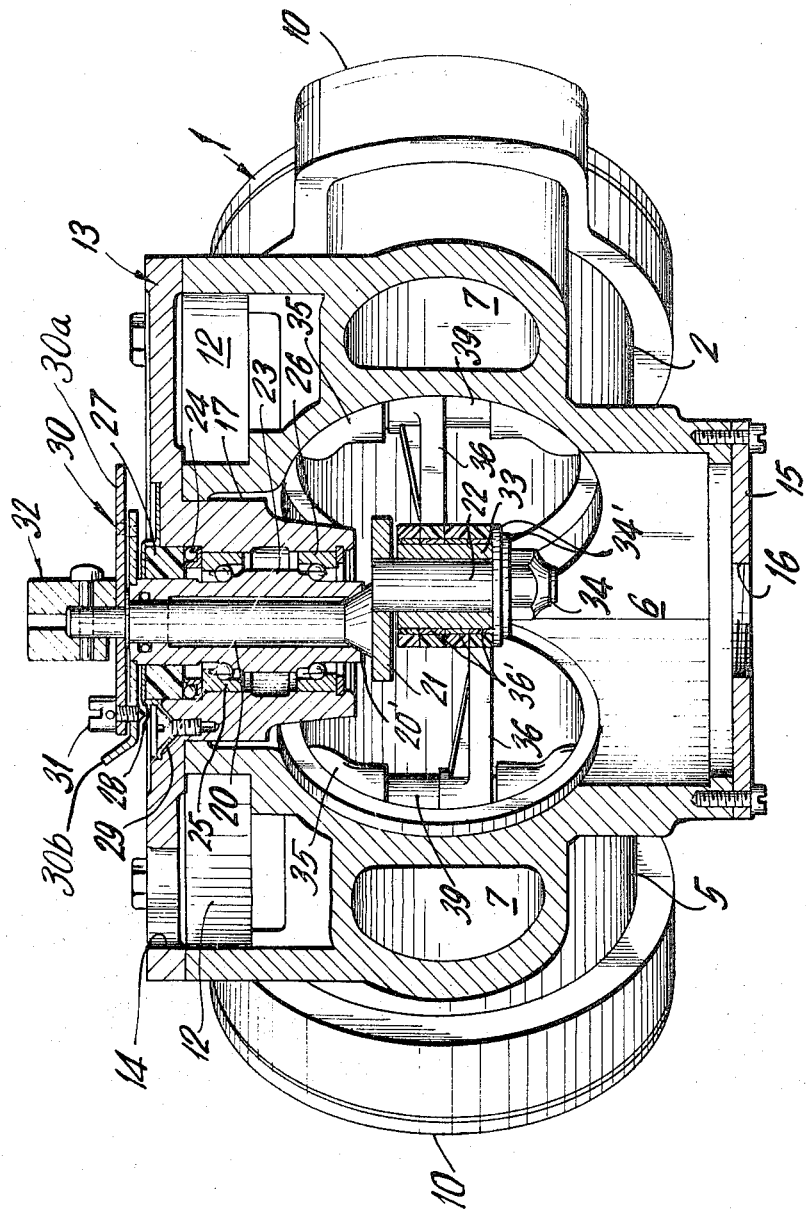
FIG. 4 is a view taken along line 4—4 in FIG. 1.
Figure 6A:
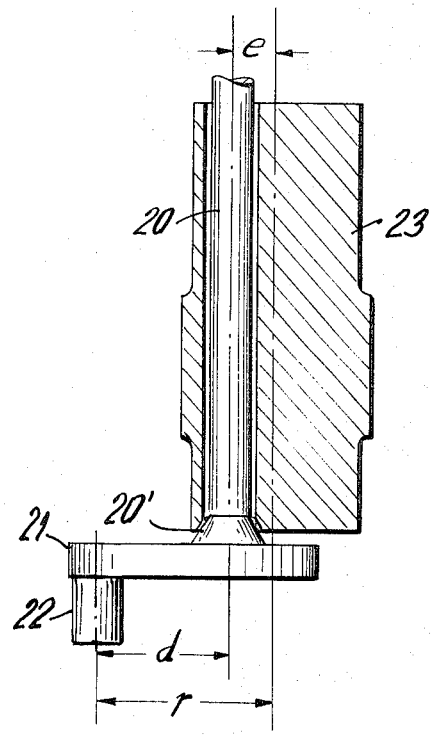
FIGS. 6A – 6D are schematic representations of the eccentric and crankshaft assembly embodied in the displacement meter of the subject invention.
Figure 6C:
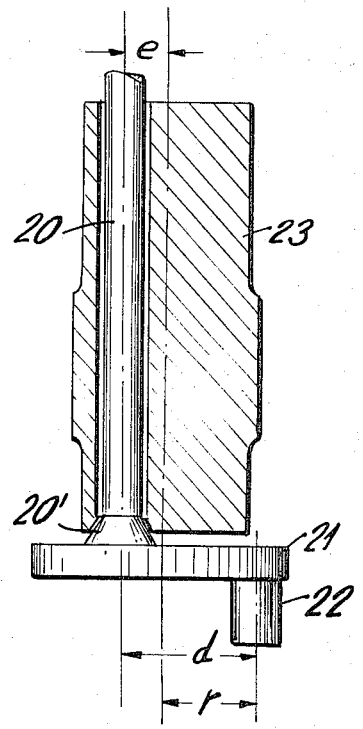
Figure 6B:
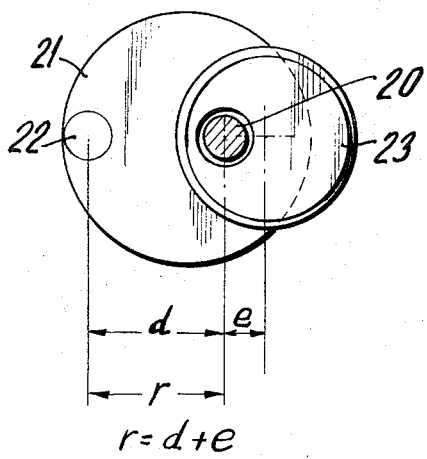
Figure 6D:
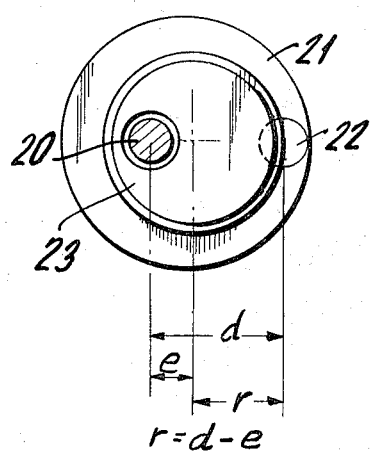

The connecting rod assembly 36 consists of a flexible connecting rod, preferably made of plastic material such as Celcon, which is not affected by volatile fluid, such as gasoline. As shown in FIG. 4, a brass bushing 36' is provided for each piston and is disposed between crankshaft pin 22 and the ends of the flexible connecting rod assembly 36. Brass bushings 36' are employed to prevent an interference fit between carbon bushing 33 on pin 22 and the connecting rod caused by changes of temperature. It is noted that the thermal expansion rate of the plastic material, such as Celcon, is much higher than that of the common metals or the carbon bushing 33.

With respect to the carbon bushing 33, it is noted that this carbon bushing has the important function of reducing the relative motion between the four connecting rods 36, because said rods all ride on bushing 33 and there is very little motion between the connecting rods and bushing 33. The principal sliding action during operation of the meter is between bushing 33 and the crankshaft pin 22.

The primary advantage of employing a flexible connecting rod is to compensate for any misalignment between the axis of the cylinder and the bearing connection between the flexible connecting rod and the piston 35. As previously mentioned, in prior art devices a rigid metallic connecting rod was employed which required careful machining, relatively large bearing clearances or "play," and a straightening operation during assembly in an attempt to obtain free operation of the meter which required that the bearing centerline be aligned with the cylinder. If the connecting rod bearing was not aligned with the center of the piston, a moment was developed and transmitted to the piston thereby causing a force reaction to occur at the cylinder walls. The force reaction, in turn, caused wear of the relatively moving parts, which in turn resulted in leakage and affected the calibration curve of the meter. This prior art problem is alleviated in the present invention by the employment of connecting rods which are readily flexed to compensate for any misalignment between the cylinder axis and the bearing centerline. Accordingly, there is no necessity for large bearing clearances in the connection betwen the flexible connecting rod 36 and the wrist pin 39 of the piston 35.

Figure 2:
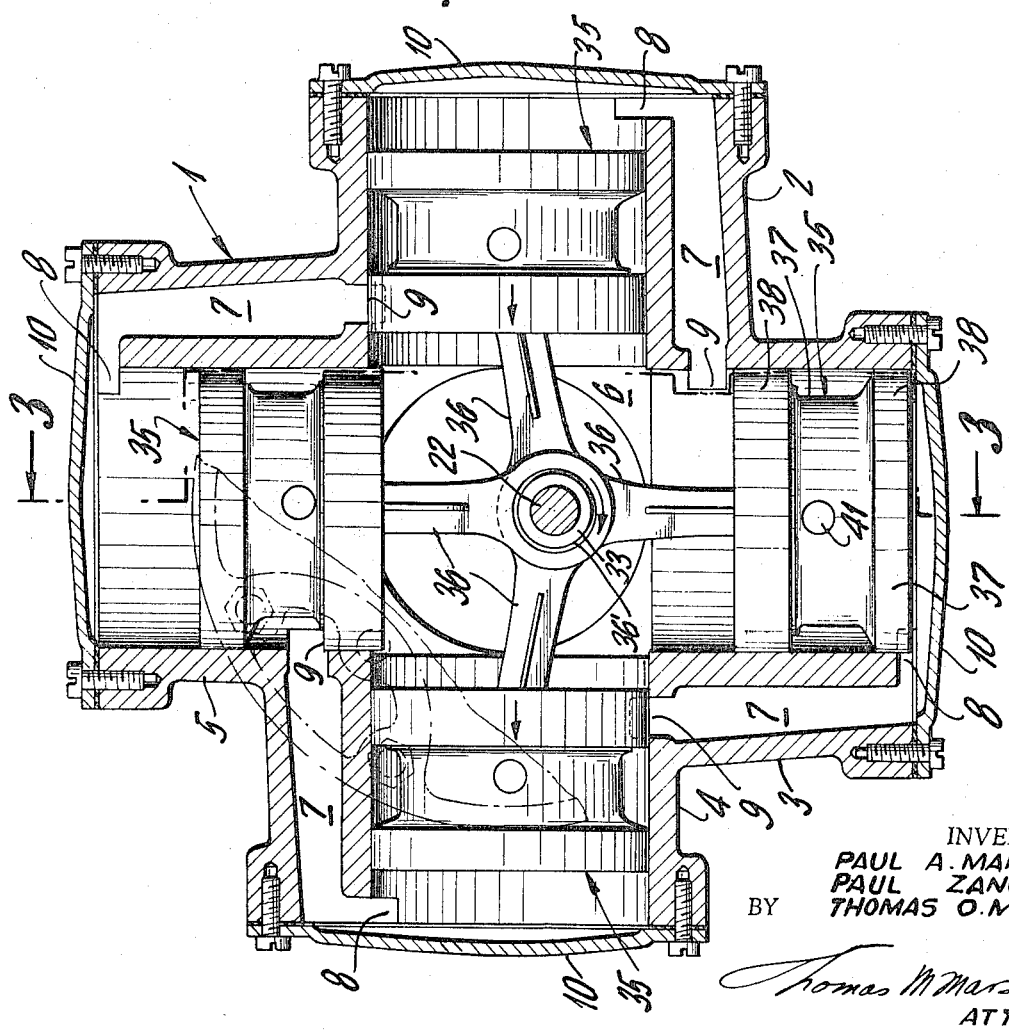
FIG. 2 is a partial sectional plan view of the displacement meter of the subject invention.

Turning to FIG. 2, it will be seen that in the position of the pistons as shown and with the rotation of the eccentric pin being clockwise, the piston in cylinder 3 is at the outward end of its stroke and the port 9 leading to cylinder 2 is open to the central chamber 6, and hence the fluid which fills the chamber 6 under the pressure of the feed pump flows through the duct 7 and port 8 into the rear of cylinder 2 adjacent cap 10.

The duct 7 of cylinder 4 is open to discharge through port 9 and cylinder 5 whereby the greater pressure of the fluid against the inner end of the piston 35 in cylinder 4 moves the piston radially outwardly thereby rotating the crankshaft 20 and causing the piston in cylinder 4 to uncover the port 9 leading to cylinder 3 so as to permit the pressurized fluid from central chamber 6 to flow through the duct 7 to the outer end of cylinder 3 to fill same as the piston in cylinder 3 moves inwardly through the operation of the crankshaft.

The piston in cylinder 5, being now at the inward end of its stroke, causes the port 9 of cylinder 4 to open to the circumferential groove 37 in the wall of the piston, and the fluid in the cylinder 4 is thus discharged by the continued outward movement of the piston in cylinder 4 through, in turn, port 8, duct 7, port 9, groove 37, outlet port 11, discharge manifold 12, and discharge opening 14 to the discharge piping (not shown).

As the piston of cylinder 4 reaches the outward end of its stroke, the piston in cylinder 5 closes the port 9 to the discharge port 11, and opens port 9 to the central chamber 6, and since the length of the piston land 38 betwen the circumferential groove 37 and the bottom of the piston is substantially equal to the width of the port 9, the closing of the port 9 to the groove 37 will be followed immediately by the opening of the port 9 to the central chamber 6. This is clearly illustrated in FIG. 2 by the arrangement of the pistons in cylinders 2 and 4.

As the crankshaft rotates, each cylinder in succession is first open to the central chamber inlet pressure, then closed to the inlet and immediately thereafter open to the discharge port 11, then closed to discharge and immediately thereafter open to inlet. In other words, the opening of the port 9 to inlet chamber 6 is instantaneous, with the result being that the port 9 is closed to discharge, and vice versa. Hence, the feed pressure operates the pistons successively and the discharge is accurately measured by each reciprocation of the pistons. The movement of th crankshaft assembly is smooth and uniform, and the rotative movement is utilized to operate a suitable indicating device which is connected to the crankshaft assembly via the meter coupling 32.

Calibration of the subject fluid meter is achieved by adjustment of the crankshaft bearing and adjustment assembly 30 so as to cause rotation of the eccentric 23 relative to the crankshaft 20, thereby displacing the position of the crankshaft pin 22 within the central chamber 6. Adjustment of the crankshaft pin 22 effects a variation in the movement of the respective pistons. The fluid meter is extremely accurate, each piston operating a definite distance, and each movement representing a specific volumetric displacement of fluid, and therefore discharges at each stroke a definite quantity of fluid. By the calibrated adjustment provided by the eccentric on the crankshaft, the quantity of fluid delivered per revolution of the crankshaft may be accurately calibrated.

It is noted that the transfer ports 9 are most conveniently located in the plane of the cylinder axes between the cylinders. Furthermore, the discharge ports 11 are displaced 90° from the transfer ports to the top side of the casing of the subject meter. As is readily apparent, in any fluid meter of the piston type, the discharge port is at the lowest pressure area in the cylinder wall. Accordingly, when the land of the piston covers this area, the piston is forced toward the discharge port thereby possibly causing friction and wear. In the subject displacement meter, this potential problem is alleviated by locating the discharge port 11 at the top of the cylinder, such that the fluid pressure is opposed by the weight of the piston. This has the effect of decreasing the net unbalanced force on the cylinder walls during part of the stroke of the piston, thereby decreasing friction and wear of the relatively movable parts of the piston and cylinder. This is extremely important in also achieveing constant sealing between the piston and cylinder, thereby preventing leakage of fluid past the piston, and inaccurate metering.

It should be also noted that the external machined surfaces of the spool piston are symmetrical about the longitudinal axis of the piston. This is of extreme importance in that it avoids the complicated machining operations required for pistons embodied in prior art meters, and permits machining of the subject pistons 35 to a much higher precision. In addition, from a functional standpoint, since groove 37 extends all the way around the piston, pressure forces act on the piston only when the land 38 covers the discharge port 11 (and, even at such times the unbalanced forces are partially offset by the piston weight, as mentioned above). In a side ported piston, as found in the prior art, the pressure forces act throughout the stroke and tend to increase friction and wear between the piston and cylinder walls, thereby contributing to leakage past the piston.

During operation of a displacement meter, radial forces are imposed on the eccentric bearing structure 25, 26 as the meter rotates due to the high fluid pressures acting on the pistons. These radial forces tend to displace the eccentric laterally due to the flexibility in the bearing retaining structure. Since the pressure drop across the meter is greater at high flows, the eccentric is displaced a greater amount which increases the stroke of the piston. Accordingly, when the meter is calibrated at one flow rate, then operated at a higher rate, the meter will pass more fluid, due to its increased displacement, than is recorded. Because a fluid meter must measure accurately within certain precribed limits, it is essential the eccentric be held as rigid as possible. This latter requirement is achieved by the subject meter by the pre-loaded ball bearing arrangement which is effective to eliminate clearances which would result in radial displacement of the eccentric or crankshaft. The pre-loaded ball bearing arrangement also eliminates the requirement for expensive precision fits between these elements. The inner races of the ball bearings are ground integrally with the eccentric 23 thereby eliminating the need for conventional separate inner bearing races and the precision machining involved. The outer race of lower bearing 26 is press fitted into the depending arm 17 of the meter cover 13. The outer race of the upper bearing 25 may be slip fitted into place to allow the force from the seal 27 to be transmitted to the ball bearings. A taper fit between the lower end of the crankshaft 20 and eccentric 23 is provided to reduce the precision machining involved, and again provide a fit with no radial clearance. The crankshaft must turn within the eccentric during calibration, however during operation of the meter, the crankshaft and eccentric turn together.

It is noted that the fluid meter of the subject invention operates accurately at various speeds of discharge and with any free flowing fluid. The parts of the meter are of simple and sturdy construction, and are in a balanced relationship during dynamic operation of the meter.

Although a preferred embodiment of the subject invention has been described and illustrated in detail, it is readily apparent that various modification and alterations of the subject displacement meter may be readily apparent to those skilled in the art.

What is claimed is:

1. A fluid displacement meter comprising:
   a. a casing including a central fluid inlet chamber, a plurality of measuring cylinders placed around said inlet chamber and open at one end thereto, the opposite end of each measuring cylinder being closed, and a discharge chamber having a port opening into each of said cylinders, said cylinders each including a duct connecting one end thereof with the opposite end of the next adjacent cylinder;
   b. a valving piston arranged one in each of said cylinders and co-operating with said port and duct to open and close the same, each piston being separably operable and including a connecting rod connecting one to each of said other pistons, each of said connecting rods being made of a flexible material to compensate for misalignment of the piston and cylinder during operation of the meter;
   c. a crankshaft rotatably supported in said casing on a movable axis and having an eccentrically mounted crank pin operating in said inlet chamber and connected to the ends of said flexible connecting rods; and
   d. means for adjusting the position of said crankshaft for effecting adjustment of the reciprocal movement of said pistons in said cylinders so as to regulate the volumetric discharge from the cylinders.

2. A fluid displacement meter as in claim 1 further including coupling means mounted externally of said casing and operatively associated with said crankshaft, said coupling means being connected to a device for indicating the volume flow of the fluid through the fluid displacement meter.

3. A fluid displacement meter as in claim 1 wherein said means for adjusting the position of said crankshaft includes an eccentric within which said crankshaft is rotabably supported, ball bearings rotatably supporting said eccentric to said casing, and means disposed externally of said casing for rotating the eccentric relative to the crankshaft in order to effect displacement of said shaft.

4. A fluid displacement meter as in claim 1 wherein said flexible connecting rods are made of a plastic material which is not affected by volatile fluids.

5. A fluid displacement meter as in claim 1 wherein each of said pistons includes an annular circmferential groove to allow passage of fluid between said ports and ducts.

6. A fluid displacement meter as in claim 1 wherein the discharge chamber is defined by an annular recess formed in the upper portion of the casing, and a cover plate secured to said casing, said cover plate including an outlet opening.

7. A fluid displacement meter as in claim 3 wherein the ball bearings supporting the eccentric are pre-loaded.

8. A fluid displacement meter having a plurality of measuring cylinders provided with pistons having connecting rods adapted to operate a totalizing device external of the meter, each of said connecting rods being made of a flexible plastic material, means for connecting each rod at one end thereof to said piston, while the opposite end of said rod is connected to the drive mechanism of said totalizing device.

9. A fluid displacement meter as in claim 8 wherein said flexible connecting rods are made of a plastic material which is not adversely affected by volatile fluids.

10. A fluid displacement meter as in claim 9 wherein each connecting rod includes a brass bushing that is disposed intermediate the connecting rod and a carbon bushing rotatively mounted on the drive mechanism of said totalizing device.

* * * * *